(12) United States Patent
Leychkis et al.

(10) Patent No.: US 7,811,389 B2
(45) Date of Patent: Oct. 12, 2010

(54) FLUX AND PROCESS FOR HOT DIP GALVANIZATION

(75) Inventors: David Leychkis, Pittsburgh, PA (US); John Zervoudis, Kilbride (CA)

(73) Assignee: Teck Metals Ltd., Vancouver, BC (CA)

( * ) Notice: Subject to any disclaimer, the term of this patent is extended or adjusted under 35 U.S.C. 154(b) by 583 days.

(21) Appl. No.: 11/640,366

(22) Filed: Dec. 18, 2006

(65) Prior Publication Data

US 2007/0137731 A1   Jun. 21, 2007

Related U.S. Application Data

(60) Provisional application No. 60/751,660, filed on Dec. 20, 2005, provisional application No. 60/810,173, filed on Jun. 2, 2006.

(51) Int. Cl.
  *B23K 35/34* (2006.01)
(52) U.S. Cl. ....................................................... 148/23
(58) Field of Classification Search .................. 148/24, 148/23
  See application file for complete search history.

(56) References Cited

U.S. PATENT DOCUMENTS

| 1,914,269 A | 6/1933 | Liban |
| 3,806,356 A | 4/1974 | Shoemaker |
| 4,496,612 A | 1/1985 | McNutt et al. |
| 4,505,958 A | 3/1985 | Lieber et al. |
| 4,802,932 A | 2/1989 | Billiet |
| 5,437,738 A * | 8/1995 | Gerenrot et al. ............... 148/26 |
| 6,200,636 B1 * | 3/2001 | van Ooij et al. ............. 427/313 |
| 6,280,795 B1 | 8/2001 | Zervoudis et al. |
| 6,284,122 B1 | 9/2001 | Memmi et al. |
| 6,921,439 B2 | 7/2005 | Warichet et al. |
| 7,160,581 B2 * | 1/2007 | Gilles et al. ................. 427/433 |

FOREIGN PATENT DOCUMENTS

| CA | 1241572 | 9/1988 |
| EP | 0 488 423 | 3/1992 |
| GB | 896266 | 5/1962 |
| JP | 2001049414 | 2/2001 |
| WO | WO 95/04607 | 2/1995 |
| WO | WO 97/35041 | 9/1997 |
| WO | WO 03/057940 | 7/2003 |
| WO | WO 2005/568676 | 6/2005 |

OTHER PUBLICATIONS

Cameo Chemicals:"Ethoxylated nonylphenol", http://www.cameochemicals.noaa.gov/chemical/8624, pp. 1-30.*
Wakerly et al., Self-Emulsification of Vegetable Oil-Nonionic Surfactant Mixtures, American Chemical Society, Feb. 3, 1986, pp. 242-255.*
Cameo Chemicals:"Ethoxylated nonylphenol", http://www.cameochemicals.noaa.gov/chemical/8624, pp. 1-30, (2008).*

* cited by examiner

*Primary Examiner*—Roy King
*Assistant Examiner*—Jessee R. Roe
(74) *Attorney, Agent, or Firm*—Elbie R. de Kock; Borden Ladner Gervais LLP

(57) ABSTRACT

A flux for use in a hot dip galvanization process has an acidic component so that the flux has a pH of about 1.5 or less. The flux also includes an alkali metal chloride and a nonionic surfactant containing polyoxyethylenated straight-chain alcohols with a hydrophile-lipophile balance (HLB) of less than 11. Depending on the particular application, the flux also includes other components, such as ferric chloride, an inhibitor containing an amino derivative and bismuth oxide.

65 Claims, No Drawings

FLUX AND PROCESS FOR HOT DIP GALVANIZATION

CROSS-REFERENCE TO RELATED APPLICATIONS

This application claims priority from U.S. Provisional Patent Application No. 60/751,660, filed Dec. 20, 2005, entitled "Flux and Process For Hot Dip Galvanization", and U.S. Provisional Patent Application No. 60/810,173, filed Jun. 2, 2006, entitled "Flux and Process For Hot Dip Galvanization", the entire contents of which applications are incorporated herein by reference.

FIELD OF THE INVENTION

This invention relates to a flux for the treatment of ferrous metals, e.g. in the form of iron or steel articles, prior to coating by dipping in molten zinc or zinc alloys. The invention is intended for application in hot dip galvanizing operations with kettles or baths holding zinc-aluminum alloys which may contain other components. The invention may also be applied to other zinc alloy systems.

BACKGROUND OF THE INVENTION

Zinc alloy coatings, having a high level of aluminum, impart increased corrosion protection to ferrous metals and improve formability as well as paintability, compared to conventional hot-dip zinc alloys. However, a high concentration of aluminum makes the coating process very sensitive to metal surface conditions. Consequently, the successful application of aluminum-rich zinc alloy coatings has been limited to some relatively expensive and sophisticated processes, such as the double dip process with standard galvanizing preceding an aluminum-zinc coating, using a suitable alloy such as GALFAN™, a trademark of International Lead Zinc Research Organization, Inc., which contains nominally 5% Al; the electro-fluxing process whereby electroplating with a thin zinc layer precedes the GALFAN™ alloy coating; and the hot process where a furnace with a reducing atmosphere is used before applying the GALFAN™ alloy coating.

Coating problems also persist at much higher aluminum concentrations (such as eutectoid compositions containing 22% Al) and with various other zinc alloy bath compositions (such as those containing vanadium, manganese, magnesium, silicon, tin, bismuth and nickel). Such specialty alloys are found to be incompatible with conventional zinc chloride/ammonium chloride fluxes. Certain patents, such as U.S. Pat. No. 6,200,636 and U.S. Pat. No. 6,284,122, attempt to deal with coating issues by deposition of a metallic layer by cementation on the steel surface. However, the successful application of such a method depends on cementing a layer of copper requiring a pristinely clean steel surface which is very difficult to achieve in practice.

Numerous attempts to apply GALFAN™ alloy coating in a traditional single-stage process have failed. Conventional fluxes used for aluminum-rich zinc alloy hot-dip galvanizing have resulted in uncoated spots, pinholes, surface roughness and bad adhesion. Special fluxes have been developed to overcome these problems. For example, U.S. Pat. No. 1,914,269 describes a galvanizing flux composition which contains ammonium chloride, zinc chloride and fluorine compounds. U.S. Pat. No. 3,806,356 discloses a pre-flux containing various combinations of fluorosilicic acid, hydrochloric acid, hydrofluoric acid, potassium fluoride and zinc chloride. U.S. Pat. No. 4,496,612 proposes an aqueous flux based on zinc chloride, ammonium chloride and from 0.6 to 3.0% fluoride ions. All of these fluxes contain acutely toxic fluorides which are hazardous to workers and the environment.

U.S. Pat. No. 4,802,932 discloses a fluoride-free top flux for kettles containing 80 to 90% $ZnCl_2$; 0 to 20% $NH_4Cl$; and, based on the weight of $ZnCl_2+NH_4Cl$, 0.01 to 5% of a wetting agent, 0 to 5% of a foaming agent, and 0 to 5% of a soluble salt of rare earths.

EP 0 488 423 B1 suggests an aqueous flux composition which comprises 10 to 50% by weight of zinc chloride and/or stannous chloride; 1 to 20% by weight of at least one alkali metal chloride or alkaline earth metal chloride; and 0.1 to 30% by weight of at least one alkyl quaternary ammonium salt wherein the alkyl groups have 1 to 18 carbons.

The flux formulations of the above-cited U.S. Pat. No. 4,802,932 and EP 0 488 423 B1 were tested on galvanizing with GALFAN™ coatings but none of them gave good results with the coatings having high roughness, pinholes and sometimes uncoated (bare) spots.

The present invention is based on analysis of the chemical processes at the surface of steel samples after pickling in acid and fluxing. It is common practice to rinse articles with water after pickling in preparation for galvanizing. While advancing to the fluxing tank, moist surfaces, which have become very active by pickling, are exposed to air. Even though the articles are carefully washed, some iron salts still remain on the surface. Therefore, the surfaces after pickling may have active iron atoms and molecules of $FeCl_2$ which are rapidly converted by air into $FeOHCl$ and $Fe(OH)_2$. Applicant has found that at least one of these compounds, $Fe(OH)_2$, cannot be dissolved in flux solution at pH>1.5. Consequently the surfaces contain $Fe(OH)_2$ which reacts with aluminum in the molten zinc-aluminum alloy, creating aluminum oxides, which are not wetted by the molten alloy, according to the following reaction:

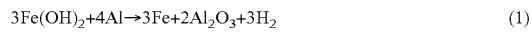

$$3Fe(OH)_2+4Al \rightarrow 3Fe+2Al_2O_3+3H_2 \quad (1)$$

This peculiar feature of galvanizing in the presence of aluminum results in unsatisfactory coatings with bare spots and pinholes.

BRIEF SUMMARY OF THE INVENTION

Applicant has found that maintaining a flux pH of less than about 1.5 leads to gradual $Fe(OH)_2$ dissolution and that the rate of this dissolution is accelerated by the presence of $FeCl_3$ in the flux. After treatment in such a flux, steel samples do not have oxygen-containing compounds on the surface, eliminating a significant problem related to hot dip galvanizing with high aluminum alloys, namely aluminum oxides on the steel surfaces.

The present invention provides aqueous flux formulations such that steel articles can more easily be coated with zinc-aluminum alloys, such as GALFAN™ alloy, as well as with other zinc-aluminum alloys with much higher aluminum concentrations (such as eutectoid compositions containing 22% Al), or with various other zinc alloy compositions (such as those containing vanadium, manganese, magnesium, silicon, tin, bismuth and nickel).

According to one aspect of the invention there is provided an aqueous flux for hot dip galvanization comprising from about 15 to 40 weight % zinc chloride, about 1 to 10 weight %, preferably about 1 to 6 weight %, ammonium chloride, about 1 to 6 weight % of an alkali metal chloride, about 0.02 to 0.1 weight % of a nonionic surfactant containing, polyoxyethylenated straight-chain alcohols with a hydrophile-lipophile balance (HLB) of less than 11, and including an acidic component so that the flux has a pH of about 1.5 or less.

According to another aspect of the invention there is provided an aqueous flux for hot dip galvanization comprising from about 15 to 40 weight % zinc chloride, about 1 to 10 weight %, preferably about 1 to 6 weight %, ammonium chloride, about 1 to 4 weight % ferric chloride, about 1 to 6 weight % of an alkali metal chloride, about 0.02 to 0.1 weight % of a nonionic surfactant containing polyoxyethylenated straight-chain alcohols with a hydrophile-lipophile balance (HLB) of less than 11, about 0.1 to 0.2 weight % of an inhibitor containing an amino derivative, and including an acidic component so that the flux has a pH of about 1.5 or less.

The flux may further comprise bismuth, such as in the form of bismuth oxide, or other suitable bismuth compound, such as bismuth chloride or bismuth oxychloride. The flux may contain $Bi_2O_3$ in an amount of at least about 0.02 weight % $Bi_2O_3$ or more, preferably about 0.05%.

According to a further aspect of the invention, there is provided an aqueous flux for hot dip galvanization of cold rolled steel comprising from about 15 to 40 weight % zinc chloride, about 1 to 10 weight % ammonium chloride, about 1 to 6 weight % of an alkali metal chloride, about 0.02 to 0.1 weight % of a nonionic surfactant containing polyoxyethylenated straight-chain alcohols with a hydrophile-lipophile balance (HLB) of less than 11, and including an acidic component so that the flux has a pH of about 1.5 or less.

According to another aspect of the invention, there is provided an aqueous flux for hot dip galvanization of cold rolled steel comprising from about 15 to 40 weight % zinc chloride, about 1 to 10 weight % ammonium chloride, about 1 to 4 weight % ferric chloride, about 1 to 6 weight % of an alkali metal chloride, about 0.02 to 0.1 weight % of a nonionic surfactant containing, polyoxyethylenated straight-chain alcohols with a hydrophile-lipophile balance (HLB) of less than 11, about 0.1 to 0.2 weight % of an inhibitor containing an amino derivative, and including an acidic component so that the flux has a pH of about 1.5 or less.

As will be further elaborated on below, the HLB number is a measure of the ratio of hydrophilic and lipophilic (hydrophobic) characteristics of the surfactant molecule.

A surfactant such as MERPOL™ SE has been found to be suitable.

Also according to the invention there is provided a process for the hot dip galvanization of an iron or steel article comprising the steps pretreating the article in a fluxing bath containing a flux as described above and subsequently dipping the article in a hot dip galvanizing bath to form a coating thereon.

The galvanizing bath may contain Zn or a Zn alloy, such as a zinc-aluminum alloy containing above about 0.02 weight % aluminum, for example containing about 5% Al and about 95% Zn, or up to about 23% of Al or more.

Instead the galvanizing bath may also contain another alloy, such as a zinc-aluminum-magnesium alloy, a zinc-aluminum-silicon alloy or a zinc-tin-bismuth-vanadium alloy.

The invention also extends to an article provided with a coating by means of a process as herein described.

DETAILED DESCRIPTION OF THE INVENTION

The main reactions between aluminum and conventional flux on steel surfaces are:

$$3H_2O+2Al \rightarrow Al_2O_3+3H_2 \quad (2)$$

$$3Fe(OH)_2+4Al \rightarrow 3Fe+2Al_2O_3+3H_2 \quad (3)$$

$$2Fe(OH)_3+4Al \rightarrow 2Fe+2Al_2O_3+3H_2 \quad (4)$$

$$3ZnCl_2+2Al \rightarrow 3Zn+2AlCl_3 \quad (5)$$

$$6NH_4Cl+2Al \rightarrow 2AlCl_3+6NH_3+3H_2 \quad (6)$$

The first three reactions create aluminum oxides on the pickled steel surface, which are not wetted by molten zinc and are the cause of bare spots on the surface.

Aluminum also reacts with oxygen absorbed on the pre-fluxed surface of the steel:

$$3O_2+4Al \rightarrow 2Al_2O_3 \quad (7)$$

These aluminum oxides become mixed with melted flux on the steel surface, increasing its viscosity and making flux removal from the surface more difficult. As result, the coating has black spots. The result of reactions (5) and (6) is gaseous aluminum chloride which mechanically interacts with viscous flux on the steel surface, resulting in roughness and lumpiness.

To prevent or dramatically reduce aluminum oxide formation, the flux of the present invention has a reduced pH, in the range of about 1.5 or below. According to equation (8), the flux dissolves the ferrous hydroxides on the steel surface, which are formed in air after rinsing. Low pH also prevents oxidation of the surface after fluxing and during drying in a preheating oven, according to equation (9):

$$Fe(OH)_2+2HCl=FeCl_2+2H_2O \quad (8)$$

$$2Fe+4HCl+O_2 \rightarrow 2FeCl_2+2H_2O \quad (9)$$

It has been found that ferric chloride in the flux helps to reduce the time of $Fe(OH)_2$ dissolution to 3 to 10 seconds.

It is common to use corrosion inhibitors in pickling tanks. In the present invention an inhibitor is included in the acidic flux to reduce the rate of iron dissolution. According to the test data, amino derivatives can reduce the rate of iron accumulation in fluxes by two to three times. Aliphatic alkyl amines (preferably $C_1$-$C_{12}$ alkyls) are examples of useful amino compounds. Specific examples are hexamethylenediamine tetra, hexapotassium hexamethylenediamine and alkyldimethyl quaternary ammonium nitrate. An inhibitor such as ARQUAD™, a trademark of Union Carbide, USA, which contains an alkyltrimethyl ammonium chloride, has been found suitable.

The alkali metal chloride components of the flux may be lithium chloride, potassium chloride or sodium chloride or mixtures of these. These chlorides improve the fluidity of the flux and contribute to better melting of the flux on the steel surface. The additional role of alkali chlorides is to bind gaseous aluminum chloride according to reaction (10), lessening its influence on pinhole formation and surface roughness.

$$MCl+AlCl_3=M(AlCl_4) \quad (10)$$

where M is Li, K or Na.

In accordance with reaction (6), it should be noted that ammonium chloride is decomposed at the coating temperature and the gaseous products of decomposition bubble onto the surface of steel immersed in the molten bath, thereby removing flux waste from the surface.

The specific action of surfactants derived from polyoxyethylenated straight-chain alcohols with an HLB<11 is not well understood. The HLB number represents a fundamental property of nonionic surfactants that correlates with physical properties and surface-active effects. The HLB number is a measure of the ratio of hydrophilic and lipophilic (hydrophobic) characteristics of the surfactant molecule. The surfactants indicated herein help produce bright, lustrous coatings. Using surfactants with other chemical characteristics or with the same characteristics, but with an HLB>11, did not produce positive effects. In some cases, the coating quality was actually worse.

Both cold rolled and hot rolled steels are used in conventional hot dip galvanizing. Cold rolled steel is usually easier to process and galvanize without defects (bare spots) because its surface is free of scale when it arrives at the plant and smoother than that of hot rolled steel. The mill scale on the surface of the hot rolled steel tends to absorb forming lubricants that are more difficult to remove in the degreaser and can affect subsequent pickling of the steel. The hot rolled steel surfaces are also rougher and the role of the flux is more demanding for producing defect free coatings. Thus, when testing the effectiveness of the various fluxes in producing smooth, continuous coatings without bare spots both cold rolled and hot rolled steels where used in the tests described below.

EXAMPLES

The following procedures were used for the examples 1 to 8 below. Cold rolled steel panels, measuring 3×70×100 mm in size, were cleaned, pickled, rinsed, and then immersed in aqueous flux solutions at temperatures of 20 to 30° C. After fluxing, the panels were dried in an electric oven for 3 minutes until the panels reached a surface temperature of 100 to 110° C. The panels were then hot dip galvanized by immersion in zinc-aluminum alloys containing 5% Al and 95% Zn for 2 minutes at a temperature of 450 to 455° C.

Example 1

In this example, an aqueous flux comprising 25% $ZnCl_2$ and 3.5% $NH_4Cl$ was used. The fluxing time was 40 seconds.

After hot dip galvanizing, the coating was rough and had bare spots, pinholes and spots of flux on the surface.

Example 2

Example 1 was repeated with the addition of 3% KCl to the aqueous flux.

After hot dip galvanizing, the coating was much smoother and had less bare spots and pinholes compared to that of Example 1.

Example 3

Example 2 was repeated with the aqueous flux pH adjusted downward to 0.6 by addition of hydrochloric acid.

The coating after hot dipping was smooth and had no bare spots or pinholes, but it was not bright and lustrous.

Example 4

Example 3 was repeated with the addition of 0.04% alcohol ethoxylate/propoxylate surfactant, such as MERPOL™ SE surfactant, to the aqueous flux.

The coating was bright and lustrous, without any defects.

Example 5

Example 4 was repeated except that the fluxing time was 3 seconds instead of 40 seconds.

The coating was bright and lustrous with a small number of pinholes.

Example 6

Example 5 was repeated with the addition of 2% $FeCl_3$ to the aqueous flux.

The coating was bright and lustrous, without any defects.

Example 7

Example 6 was repeated with the addition of 0.2% inhibitor, ARQUAD™ 12-50 (a trademark of Union Carbide, USA), which contains an alkyltrimethyl ammonium chloride.

The coating was similar in quality to that of Examples 4 and 6.

Example 8

Example 7 was repeated except that 4% NaCl was used, instead of 3% KCl.

The coating was similar in quality to that of Examples 4, 6 and 7.

The purpose of the tests, shown as examples 9 to 14 below, was to demonstrate the effectiveness of three flux compositions on both cold rolled and hot rolled steel dipped in a similar alloy as in examples 1 to 8.

Example 9

In this example, a conventional commercial "double salt" flux, namely an aqueous flux comprising 13.75% $ZnCl_2$ and 11.25% $NH_4Cl$, was used. The flux time was 2 minutes at a temperature of 70° C. The steel sample was hot rolled steel.

After hot dip galvanizing, the coating was rough and did not cover most of the sample. There was a large portion of bare spots.

Example 10

Example 9 was repeated with the exception of the steel sample, which was cold rolled steel.

After hot dip galvanizing, the coating was rough with some shiny spots, but mostly a cloudy appearance. The coating covered the entire sample but had a poor appearance.

As can be seen, the flux produced marginal results on the cold rolled steel, and unacceptable results on the hot rolled steel.

Example 11

In this example, an aqueous flux comprising 25% $ZnCl_2$, 4% $NH_4Cl$, 4% KCl, 0.04% MERPOL™ SE surfactant and 0.4% hydrochloric acid, was used, so that the flux had a pH<1.5. The flux time was 45 seconds at a temperature between 20-30° C. The steel sample was hot rolled steel.

After hot dip galvanizing, the coating was rough with some shiny spots but mostly a cloudy appearance. The coating did not cover the entire sample.

Example 12

Example 11 was repeated with the exception of the steel sample, which was cold rolled steel.

After hot dip galvanizing, the coating was smooth and shiny with some cloudy spots. There were no bare spots on the sample and the quality appeared to be good.

As can be seen, the flux produced good results on the cold rolled steel, but results on the hot rolled steel were marginal.

Example 13

Example 11 was repeated with the addition of 0.05% $Bi_2O_3$ in the flux.

After hot dip galvanizing, the coating was smooth and shiny with a spangle pattern. There were no bare spots on the sample and the quality appeared to be very good.

Example 14

Example 13 was repeated with the exception of the steel sample, which was cold rolled steel.

After hot dip galvanizing, the coating was smooth and shiny with a spangle pattern. There were no bare spots on the sample and the quality appeared to be very good.

As can be seen, the flux with an addition of $Bi_2O_3$ produced good results on both the cold rolled and hot rolled steel.

The tests shown as examples 15 to 27 below were performed to demonstrate the effectiveness of a flux also containing $Bi_2O_3$ when galvanizing with Zn—Al alloys containing aluminum levels ranging from 5% to 18% Al, and Si levels ranging from 0.01%-0.15% Si.

The results of these experiments showed that the flux produced commercially acceptable coatings, free of defects on hot rolled steels with all the alloy compositions.

The following procedures were used for the examples 15 to 27 below. Hot rolled steel panels, measuring 4×3×⅛ inches in size, were degreased, pickled, rinsed and then immersed in an aqueous flux solution comprising 25% $ZnCl_2$, 4% $NH_4Cl$, 4% KCl, 0.04% MERPOL™ SE surfactant, 0.4% hydrochloric acid (so that the flux has a pH<1.5) and 0.05% $Bi_2O_3$ for 45 seconds at a temperature of 20-30° C. The panels were dried in an electric oven for 5 minutes at a temperature of 140° C. The panels were then hot dip galvanized by an immersion speed of 1½ ft/min for 6 minutes.

Example 15

In this example, the bath alloy was special high grade (SHG) Zn. The samples were dipped at a temperature of 450-455° C.

After hot dip galvanizing, the coating was smooth and shiny. There were no bare spots and the quality appeared to be very good.

Example 16

In this example, the bath alloy was 95% Zn and 5% Al. The samples were dipped at a temperature of 450-455° C.

After hot dip galvanizing, the coating appeared smooth and shiny with a small spangle pattern. There were no bare spots and the quality appeared to be very good.

Example 17

In this example the bath alloy was 95% Zn, 5% Al and 0.01% Si. The samples were dipped at a temperature of 485-490° C.

After hot dip galvanizing, the coating was smooth and shiny. There were no bare spots and the quality appeared to be very good.

Example 18

In this example, the bath alloy was 95% Zn, 5% Al and 0.03% Si. The samples were dipped at a temperature of 505-510° C.

After hot dip galvanizing, the coating was smooth and shiny. There were no bare spots and the quality appeared to be very good.

Example 19

In this example, the bath alloy was 88% Zn, 12% Al and 0.01% Si. The samples were dipped at a temperature of 470-475° C.

After hot dip galvanizing, the coating was smooth with a grayish color. There were no bare spots and the quality appeared to be very good.

Example 20

In this example, the bath alloy was 88% Zn, 12% Al and 0.03% Si. The samples were dipped at a temperature of 490-495° C.

After hot dip galvanizing, the coating was smooth with a grayish color. There were no bare spots and the quality appeared to be very good.

Example 21

In this example, the bath alloy was 88% Zn, 12% Al and 0.06% Si. The samples were dipped at a temperature of 510-515° C.

After hot dip galvanizing, the coating was smooth with a grayish color. There were no bare spots and the quality appeared to be very good.

Example 22

In this example, the bath alloy was 88% Zn, 12% Al and 0.15% Si. The samples were dipped at a temperature of 475-480° C.

After hot dip galvanizing, the coating was smooth and shiny with a small spangle pattern. There were no bare spots and the quality appeared to be very good.

Example 23

In this example, the bath alloy was 85% Zn and 15% Al. The samples were dipped at a temperature of 470-475° C.

After hot dip galvanizing, the coating was very rough with a grayish color. There were no bare spots throughout the rough thick coating.

Example 24

In this example, the bath alloy was 85% Zn, 15% Al and 0.01% Si. The samples were dipped at a temperature of 460-465° C.

After hot dip galvanizing, the coating was smooth with a grayish color. There were no bare spots and the quality appeared to be very good.

Example 25

In this example, the bath alloy was 85% Zn, 15% Al and 0.02% Si. The samples were dipped at a temperature of 480-485° C.

After hot dip galvanizing, the coating was smooth with a grayish color. There were no bare spots and the quality appeared to be very good.

Example 26

In this example, the bath alloy was 85% Zn, 15% Al and 0.04% Si. The samples were dipped at a temperature of 510-515° C.

After hot dip galvanizing, the coating was smooth with a grayish color. There were no bare spots and the quality appeared to be very good.

Example 27

In this example the bath alloy was 82% Zn, 18% Al and 0.01% Si. The samples were dipped at a temperature of 500-505° C.

After hot dip galvanizing, the coating was very rough with a grayish color. There were no bare spots with the exception of the rough thick coating.

The tests shown as examples 28 to 33 below were performed to compare the effectiveness of three fluxes when galvanizing cold rolled and hot rolled steels in a Zn-23% Al alloy.

The following procedures were used for the examples 28 to 33 below. Hot rolled and cold rolled steel panels measuring 4×3×⅛ inches in size were degreased, pickled, rinsed and then immersed in aqueous flux solutions. The panels were dried in an electric oven for 5 minutes at a temperature of 140° C. The panels were then hot dip galvanized by immersion of 2 ft/min in an alloy containing 77% Zn and 23% Al for 2 minutes at a temperature of 540 to 545° C.

Example 28

In this example, a conventional commercial "double salt" flux, namely an aqueous flux comprising 13.75% $ZnCl_2$ and 11.25% $NH_4Cl$, was used. The flux time was 2 minutes at a temperature of 70° C. The steel panels used were hot rolled.

After hot dip galvanizing, there was very little coverage and most of the steel was exposed.

Example 29

Example 28 was repeated with cold rolled steel panels.
After hot dip galvanizing, there was very little coverage and most of the steel was exposed.
As can be seen, the flux produced unacceptable results.

Example 30

In this example, an aqueous flux comprising 25% $ZnCl_2$, 4% $NH_4Cl$, 4% KCl, 0.04% MERPOL™ SE surfactant and 0.4% hydrochloric acid, so that the flux has a pH<1.5, was used. The flux time was 45 seconds at a temperature between 20-30° C. The steel panels used were hot rolled.

After hot dip galvanizing, the coating was rough and did not cover most of the sample. There was a large portion of bare spots.

Example 31

Example 30 was repeated with cold rolled steel panels.
After hot dip galvanizing, the coating was rough and did not cover most of the sample. There was a large portion of bare spots.
As can be seen, the flux did not produce acceptable results with an alloy containing 23% by weight of Al on both hot and cold rolled steels Example 32

Example 30 was repeated with the addition of 0.05% $Bi_2O_3$ to the aqueous flux. The steel panels used were hot rolled steel.

After hot dip galvanizing, the coating was rough with a grayish color. There were no bare spots on the sample.

Example 33

Example 32 was repeated with cold rolled steel panels.
After hot dip galvanizing, the coating was rough with a grayish color. There were no bare spots on the sample.
As can be seen the flux with the addition of $Bi_2O_3$ produced good results.

The purpose of the tests, shown as examples 34 to 39 below, was to demonstrate the effectiveness of three different flux compositions for galvanizing with a Zn—Sn—Bi—V alloy such as described in U.S. Pat. No. 6,280,795, the entire contents of which is incorporated herein by reference. The purpose of this alloy is for controlling steel reactivity during galvanizing of hot rolled, high silicon containing steels. Past work had showed that the use of conventional fluxes with this alloy produced coatings with bare spots.

As will be seen from Example 37 below, samples of cold rolled steel galvanized with this alloy produced good coatings with the flux of Example 36 without the addition of $Bi_2O_3$.

The following procedures were used for the examples below. Hot rolled and cold rolled steel panels, measuring 4×3×⅛ inches in size, were degreased, pickled, rinsed and then immersed in aqueous flux solutions. The panels were dried in an electric oven for 5 minutes. The panels were then hot dip galvanized by immersion of 3 ft/min in an alloy containing 98.9% Zn, 1% Sn, 0.1% Bi, 0.005% Al and 0.035% V for 4 minutes at a temperature of 440 to 445° C.

Example 34

In this example, a conventional commercial "double salt" flux was used, namely an aqueous flux comprising 13.75% $ZnCl_2$ and 11.25% $NH_4Cl$. The flux time was 2 minutes at a temperature of 70° C. The steel sample was hot rolled steel.

After hot dip galvanizing, the coating was smooth and shiny with a spangle pattern. However, there were several small bare spots on the sample.

Example 35

Example 34 was repeated with the exception of the steel sample, which was cold rolled steel.

After hot dip galvanizing, the coating was smooth and shiny with a spangle pattern. There were no bare spots on the sample and the quality appeared to be very good.

Example 36

In this example, an aqueous flux comprising 25% $ZnCl_2$, 4% $NH_4Cl$, 4% KCl, 0.04% MERPOL™ SE surfactant and 0.4% hydrochloric acid, so that the flux has a pH<1.5, was used. The flux time was 45 seconds at a temperature between 20-30° C. The steel sample was hot rolled steel.

After hot dip galvanizing, the coating was smooth and shiny with a spangle pattern. There were several small bare spots on the sample but fewer bare spots than in Example 34.

Example 37

Example 36 was repeated with the exception of the steel sample, which was cold rolled steel.

After hot dip galvanizing, the coating was smooth and shiny with a spangle pattern. There were no bare spots on the sample and the quality appeared to be very good.

Example 38

Example 36 was repeated with the addition of 0.05% $Bi_2O_3$ to the flux.

After hot dip galvanizing, the coating was smooth and shiny with a spangle pattern. There were no bare spots on the sample and the quality appeared to be very good.

Example 39

Example 38 was repeated with the exception of the steel sample, which was cold rolled steel.

After hot dip galvanizing, the coating was smooth and shiny with a spangle pattern. There were no bare spots on the sample and the quality appeared to be very good.

The purpose of the tests shown as examples 40 to 42 below, was to demonstrate the effectiveness of three flux compositions for galvanizing with a Zn—Al—Mg alloy.

The following procedures were used for these examples. Hot rolled steel panels, measuring 4×3×⅛ inches in size, were degreased, pickled, rinsed and then immersed in aqueous flux solutions. The panels were dried in an electric oven for 5 minutes at a temperature of 100° C. The panels were then hot dip galvanized by immersion at a rate of 3 ft/min in an alloy containing 94.7% Zn, 5 % Al and 0.3% Mg for 2 minutes at a temperature of 430 to 435° C.

Example 40

In this example the aqueous flux comprised 13.75% $ZnCl_2$ and 11.25% $NH_4Cl$. The flux time was 2 minutes at a temperature of 70° C.

After hot dip galvanizing, the coating was rough and did not cover most of the sample. There was a large portion of bare spots.

Example 41

In this example the aqueous flux comprised 25% $ZnCl_2$, 4% $NH_4Cl$, 4% KCl and 0.4% hydrochloric acid so that the flux has a pH<1.5. The flux time was 45 seconds at a temperature between 20-30° C.

After hot dip galvanizing, the coating was shiny but had bare spots. The coating did not cover the entire sample. However, it was an improvement to the previous example.

Example 42

Example 41 was repeated with the addition of 0.05% $Bi_2O_3$ and 0.05% MERPOL™ SE surfactant.

After hot dip galvanizing, the coating was smooth and shiny. There were no bare spots on the sample and the quality appeared to be very good.

It can be seen from the above results that the addition of KCl and HCl so that the pH<1.5 gave improved, although not yet entirely acceptable results and that the addition of $Bi_2O_3$ and the MERPOL™ SE surfactant resulted in a good quality product.

From the above it will be clear that a suitable flux can be tailored according to the article to be coated, e.g. whether it is cold rolled or hot rolled steel, as well as the particular alloy with which the coating is to be effected. It can be seen that in cases where the article is of a type that is more difficult to coat or, for example, in cases where an alloy with a high aluminum content is to be used, the presence of bismuth in the flux is required, whereas in less demanding cases, the presence of bismuth is not required. A flux can therefore be selected as dictated by the specific requirements in a particular case.

Although certain preferred embodiments of the present invention have been shown and described in detail, it should be understood that various changes and modifications may be made therein without departing from the scope of the appended claims.

The claims which follow are to be considered an integral part of the present disclosure. The term "comprises" or "comprising", as used herein and in the claims, has its customary non-restrictive meaning which denotes that in addition to any items to which the term relates, there may be included additional items not specifically mentioned.

We claim:

1. An aqueous flux for hot dip galvanization comprising from about 15 to 40 weight % zinc chloride, about 1 to 10 weight % ammonium chloride, about 1 to 6 weight % of an alkali metal chloride, about 0.02 to 0.1 weight % of a nonionic surfactant containing polyoxyethylenated straight-chain alcohols with a hydrophile-lipophile balance (HLB) of less than 11, and including an acidic component so that the flux has a pH of about 1.5 or less.

2. The flux of claim 1 comprising about 1 to 6 weight % ammonium chloride.

3. The flux of claim 1 further comprising about 1 to 4 weight % ferric chloride.

4. The flux of claim 1 wherein the alkali metal chloride comprises one or more of the group consisting of lithium chloride, potassium chloride and sodium chloride.

5. The flux according to claim 1 wherein the acidic component comprises hydrochloric acid.

6. The flux of claim 1 further comprising about 0.1 to 0.2 weight % of an inhibitor containing an amino derivative.

7. The flux of claim 6 wherein the amino derivative comprises an aliphatic alkyl amine.

8. The flux of claim 7 wherein the alkyl amine comprises one or more of the group consisting of $C_1$ to $C_{12}$ alkyl amines.

9. The flux of claim 8 wherein the alkyl amine is selected from one or more of hexamethylenediamine tetra, hexapotassium hexamethylenediamine and alkyldimethyl quaternary ammonium nitrate.

10. The flux of claim 6 wherein the amino derivative comprises an alkyltrimethyl ammonium chloride.

11. The flux of claim 1 further comprising about 0.05% $Bi_2O_3$.

12. A fluxing bath for hot dip galvanization containing the flux of claim 11.

13. A process for the hot dip galvanization of an iron or steel article comprising the steps of pretreating the article in a fluxing bath as defined in claim 12 and subsequently dipping the article in a hot dip galvanizing bath to form a coating thereon.

14. The process of claim 13, wherein the galvanizing bath contains a zinc-aluminum-silicon alloy.

15. The process of claim 13, wherein the galvanizing bath contains a zinc-aluminum alloy containing from about 0.02% up to about 23% aluminum or more.

16. The process of claim 13 wherein the galvanizing bath contains a zinc-tin-bismuth-vanadium alloy.

17. The process of claim 13, wherein the galvanizing bath contains a zinc-aluminum-magnesium alloy.

18. An iron or steel article provided with a coating according to the process of claim 13.

19. The article of claim 18, wherein the article is of hot rolled steel.

20. A fluxing bath for hot dip galvanization containing the flux of claim 1.

21. A process for the hot dip galvanization of an iron or steel article comprising the steps of pretreating the article in a fluxing bath as defined in claim 20 and subsequently dipping the article in a hot dip galvanizing bath to form a coating thereon.

22. The process of claim 21 wherein the galvanizing bath contains Zn or a Zn alloy.

23. An iron or steel article provided with a coating according to the process of claim 21.

24. The process of claim 21 wherein the galvanizing bath contains a zinc-aluminum alloy.

25. The process of claim 24 wherein the alloy contains about 5% Al and about 95% Zn.

26. An aqueous flux for hot dip galvanization comprising from about 15 to 40 weight % zinc chloride, about 1 to 10 weight % ammonium chloride, about 1 to 4 weight % ferric chloride, about 1 to 6 weight % of an alkali metal chloride, about 0.02 to 0.1 weight % of a nonionic surfactant containing, polyoxyethylenated straight-chain alcohols with a hydrophile-lipophile balance (HLB) of less than 11, about 0.1 to 0.2 weight % of an inhibitor containing an amino derivative, and including an acidic component so that the flux has a pH of about 1.5 or less.

27. The flux of claim 26 comprising about 1 to 6 weight % ammonium chloride.

28. A fluxing bath for hot dip galvanization containing the flux of claim 26.

29. A process for the hot dip galvanization of an iron or steel article comprising the steps of pretreating the article in a fluxing bath as defined in claim 28 and subsequently dipping the article in a hot dip galvanizing bath to form a coating thereon.

30. An iron or steel article provided with a coating according to the process of claim 29.

31. The process of claim 29 wherein the galvanizing bath contains Zn or a Zn alloy.

32. The process of claim 29 wherein the galvanizing bath contains a zinc-aluminum alloy.

33. The process of claim 32 wherein the alloy contains about 5% Al and about 95% Zn.

34. The flux of claim 26 further comprising about 0.05% $Bi_2O_3$.

35. A fluxing bath for hot dip galvanization containing the flux of claim 34.

36. A process for the hot dip galvanization of an iron or steel article comprising the steps of pretreating the article in a fluxing bath as defined in claim 35 and subsequently dipping the article in a hot dip galvanizing bath to form a coating thereon.

37. The process of claim 36 wherein the galvanizing bath contains a zinc-tin-bismuth-vanadium alloy.

38. The process of claim 36, wherein the galvanizing bath contains a zinc-aluminum-silicon alloy.

39. The process of claim 36, wherein the galvanizing bath contains a zinc-aluminum alloy containing from about 0.02% up to about 23% aluminum or more.

40. An iron or steel article provided with a coating according to the process of claim 36.

41. The article of claim 40, wherein the article is of hot rolled steel.

42. An aqueous flux for hot dip galvanization of cold rolled steel comprising from about 15 to 40 weight % zinc chloride, about 1 to 10 weight % ammonium chloride, about 1 to 6 weight % of an alkali metal chloride, about 0.02 to 0.1 weight % of a nonionic surfactant containing polyoxyethylenated straight-chain alcohols with a hydrophile-lipophile balance (HLB) of less than 11, and including an acidic component so that the flux has a pH of about 1.5 or less.

43. The flux of claim 42 comprising about 1 to 6 weight % ammonium chloride.

44. The flux of claim 42 further comprising about 1 to 4 weight % ferric chloride.

45. The flux of claim 42 wherein the alkali metal chloride comprises one or more of the group consisting of lithium chloride, potassium chloride and sodium chloride.

46. The flux of claim 42 further comprising about 0.1 to 0.2 weight % of an inhibitor containing an amino derivative.

47. The flux of claim 46 wherein the amino derivative comprises an alkyltrimethyl ammonium chloride.

48. The flux of claim 46 wherein the amino derivative comprises an aliphatic alkyl amine.

49. The flux of claim 48 wherein the alkyl amine comprises one or more of the group consisting of $C_1$ to $C_{12}$ alkyl amines.

50. The flux of claim 49 wherein the alkyl amine is selected from one or more of hexamethylenediamine tetra, hexapotassium hexamethylenediamine and alkyldimethyl quaternary ammonium nitrate.

51. The flux according to claim 42 wherein the acidic component comprises hydrochloric acid.

52. A fluxing bath for hot dip galvanization of cold rolled steel containing the flux of claim 42.

53. A process for the hot dip galvanization of an iron or cold rolled steel article comprising the steps of pretreating the article in a fluxing bath as defined in claim 52 and subsequently dipping the article in a hot dip galvanizing bath to form a coating thereon.

54. An iron or steel article provided with a coating according to the process of claim 53.

55. The process of claim 53 wherein the galvanizing bath contains Zn or a Zn alloy.

56. The process of claim 53 wherein the galvanizing bath contains a zinc-aluminum alloy.

57. The process of claim 56 wherein the alloy contains about 5% Al and about 95% Zn.

58. An aqueous flux for hot dip galvanization of cold rolled steel comprising from about 15 to 40 weight % zinc chloride, about 1 to 10 weight % ammonium chloride, about 1 to 4 weight % ferric chloride, about 1 to 6 weight % of an alkali metal chloride, about 0.02 to 0.1 weight % of a nonionic surfactant containing, polyoxyethylenated straight-chain alcohols with a hydrophile-lipophile balance (HLB) of less than 11, about 0.1 to 0.2 weight % of an inhibitor containing an amino derivative, and including an acidic component so that the flux has a pH of about 1.5 or less.

59. The flux of claim 58 comprising about 1 to 6 weight % ammonium chloride.

60. A fluxing bath for hot dip galvanization of cold rolled steel containing the flux of claim 58.

61. A process for the hot dip galvanization of an iron or cold rolled steel article comprising the steps of pretreating the article in a fluxing bath as defined in claim 60 and subsequently dipping the article in a hot dip galvanizing bath to form a coating thereon.

62. An iron or steel article provided with a coating according to the process of claim 61.

63. The process of claim 61 wherein the galvanizing bath contains Zn or a Zn alloy.

64. The process of claim 61 wherein the galvanizing bath contains a zinc-aluminum alloy.

65. The process of claim 64 wherein the alloy contains about 5% Al and about 95% Zn.

* * * * *